(12) United States Patent
Maitlen

(10) Patent No.: US 8,412,435 B2
(45) Date of Patent: Apr. 2, 2013

(54) SYSTEM AND METHOD FOR DETECTION OF SPUN VEHICLE

(75) Inventor: Daniel S. Maitlen, Farmington Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1335 days.

(21) Appl. No.: 11/868,807

(22) Filed: Oct. 8, 2007

(65) Prior Publication Data
US 2009/0093991 A1 Apr. 9, 2009

(51) Int. Cl.
*G06F 17/00* (2006.01)
*G05D 1/00* (2006.01)

(52) U.S. Cl. ........... 701/82; 701/38; 701/70; 701/71; 701/80; 701/90; 701/91; 303/139; 303/140; 303/146; 303/148; 303/149; 303/150; 180/197

(58) Field of Classification Search .......... 701/1, 36, 701/38, 69–77, 80, 82, 88–92; 303/121, 303/139, 140, 143, 146–150, 163–175; 180/197
See application file for complete search history.

(56) References Cited

U.S. PATENT DOCUMENTS

| | | | | |
|---|---|---|---|---|
| 5,710,705 | A * | 1/1998 | Eckert | 701/83 |
| 6,205,375 | B1 * | 3/2001 | Naito | 701/1 |
| 6,549,842 | B1 * | 4/2003 | Hac et al. | 701/80 |
| 6,659,570 | B2 * | 12/2003 | Nakamura | 303/146 |
| 6,856,868 | B1 * | 2/2005 | Le et al. | 701/38 |
| 6,892,123 | B2 * | 5/2005 | Hac | 701/48 |
| 7,922,196 | B2 * | 4/2011 | Le et al. | 280/735 |
| 2003/0074127 | A1 * | 4/2003 | Kin et al. | 701/80 |
| 2005/0247510 | A1 * | 11/2005 | Asano | 180/421 |
| 2006/0267404 | A1 * | 11/2006 | Yasui et al. | 303/146 |
| 2009/0177346 | A1 * | 7/2009 | Hac | 701/29 |

FOREIGN PATENT DOCUMENTS

| | | | |
|---|---|---|---|
| JP | 2005206075 A | * | 8/2005 |
| KR | 2008022758 | * | 9/2006 |

OTHER PUBLICATIONS

Huh, K. et al., Abstract of "Monitoring System Design for Estimating the Lateral Tyre Force", SAGE Journals—Proceedings of the Institution of Mechanical Engineers, Part D: Journal of Automobile Engineering, Apr. 1, 2003, vol. 217, No. 4, pp. 247-256. Retrieved from Internet: http://pid.sagepub.com/content/217/4/247.abstract.
"Normal Force", Wikipedia definition. Retrieved on Feb. 2, 2012 from Internet: http://en.wikipedia.org/wiki/Normal_force.
"Inertial Measurement Unit", Wikipedia definition. Retrieved on Feb. 4, 2012 from Internet: http://en.wikipedia.org/wiki/Intertial_measurement_unit.
"Lateral Force Variation", Wikipedia definition. Retrieved on Feb. 2, 2012 from Internet: http://en.wikipedia.org/wiki/Lateral_force_variation.

(Continued)

*Primary Examiner* — John Q Nguyen
*Assistant Examiner* — Chuong Nguyen
(74) *Attorney, Agent, or Firm* — Ingrassia Fisher & Lorenz, P.C.

(57) ABSTRACT

A system, method and computer program product is provided for detecting if a vehicle has spun. A normal force and a lateral force of each of a front and rear axle of a vehicle is estimated. A coefficient of friction representative of a surface is estimated. Lateral momenta of the front and rear axles based on the coefficient of friction and the normal and lateral forces is calculated. Whether a surplus momentum is present, is determined. If the surplus momentum is present, a yaw rate of the vehicle is integrated respect to time to obtain a vehicle rotation estimation.

21 Claims, 3 Drawing Sheets

OTHER PUBLICATIONS

"Differentiator and Integrator Circuits". Retrieved on Feb. 4, 2012 from Internet: http://www.allaboutcircuits.com/vol_3/chpt_8/11.html.

Canudas-De-Wit, Carlos et al., "Dynamic Friction Models for Road/Tire Longitudinal Interaction", Vehicle System Dynamics, Oct. 14, 2002, pp. 1-35.

* cited by examiner

SYSTEM AND METHOD FOR DETECTION OF SPUN VEHICLE

TECHNICAL FIELD

The present invention generally relates to automotive control systems, and more particularly relates to a method and a system for when a vehicle has spun.

BACKGROUND OF THE INVENTION

Dynamics control systems are increasingly used in automotive vehicles to improve vehicle safety and satisfy government regulations. Examples of such systems include vehicle active safety systems like vehicle electronic stability control (ESC) systems, comprehensive safety vehicle (CSV) systems, and vehicle lane change assist systems. For those safety systems to operate effectively, accurate and timely knowledge of vehicle dynamic states are required.

When a moving vehicle has rotated or "spun" such that the vehicle's corresponding velocity vector is pointing to the side or rear of the vehicle, stability control systems can provide very little benefit to the directional control of the vehicle. In this case, the stability control system should be disabled until the vehicle has been properly oriented.

Accordingly, the need exists for a system and method for such stability control systems for detecting if a vehicle has spun. In addition, it is desirable to implement such a system and method using commonly available parts consistent with and compatible with the stability control system. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, by way of example only, a method is provided for detecting if a vehicle has spun. A normal force and a lateral force of each of the front and rear axles of a vehicle is estimated. A coefficient of friction representative of surface is estimated. Lateral momenta of the front and rear axles based on the normal and lateral forces, and the coefficient, is calculated. Whether a surplus momentum is present, is determined. If the surplus momentum is present, a yaw rate of the vehicle is integrated with respect to time to obtain a vehicle rotation estimation.

In another embodiment, again by way of example only, a system is provided for determining if a vehicle has spun. A processor has a plurality of sensors configured to receive a plurality of dynamic parameters of the vehicle. The processor is configured to estimate a normal force and a lateral force of each of the front and rear axles of a vehicle, estimate a coefficient of friction representative of surface, calculate lateral momenta of the front and rear axles based on the normal and lateral forces, and the coefficient, determine whether a surplus momentum is present, and if the surplus momentum is present, integrate a yaw rate of the vehicle with respect to time to obtain a vehicle rotation estimation.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

A vehicle stability control system must operate the brakes or steering properly so as to ensure safe operation. Appropriate operation is rooted in knowing the direction the vehicle is traveling relative to the orientation of the vehicle, or its so-called "body orientation." The following description presents a system and method which can reliably indicate when the direction the vehicle is traveling and its body orientation have separated by more than ninety (90) degrees. Accordingly, the present system and method helps to ensure the safe and reliable operation of a stability control system in a vehicle.

More specifically, the following description and claimed subject matter presents a novel system and method for determination if a vehicle has spun. The method can be organized into six different stages. During the various stages, a variety of estimations are performed. These estimations utilize various dynamic parameters associated with the vehicle, such as longitudinal acceleration, yaw rate, and lateral acceleration. The dynamic parameters may be measured and/or estimated, for example, using sensors placed on the vehicle and coupled to a processor.

In the first stage, the normal force and lateral force acting on both the front and rear axles of the vehicle are estimated. In the second stage, a coefficient representing the surface upon which the vehicle is traveling is estimated. In the third stage, lateral momenta of the front and rear axles are calculated using the forces estimated during the first stage and the coefficient estimated during the second stage.

In the fourth stage, the momentum found at each axle is compared with a threshold, based on the surface coefficient estimate. If either the front or rear momentum exceeds this threshold, a surplus of momentum for that surface is detected. In the fifth stage, if surplus momentum is detected, the yaw rate of the vehicle is integrated with respect to time. This value is the amount the vehicle has rotated with respect to its velocity vector.

In the sixth stage, the amount of vehicle rotation is compared against a threshold. If the vehicle has rotated such that it is traveling sideways or backwards (i.e., more than 90 degrees of vehicle orientation as compared to the velocity vector), then a vehicle spun state is detected.

Figure 1:
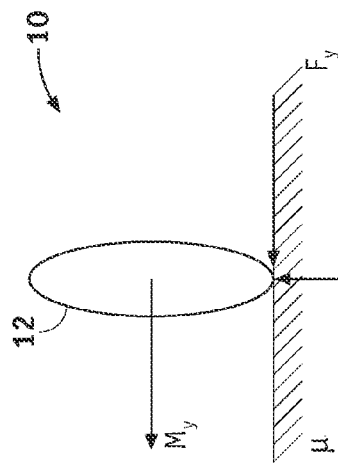
FIG. 1 is a simple free body diagram showing the forces and momentum on a lumped tire-axle model for a vehicle.

An early indicator that a vehicle may spin occurs when either the front or rear axle lateral supporting force is lost. A simple lumped tire-axle model 10 displaying the applicable forces involved is shown in FIG. 1. These forces include a normal force, $F_z$, a lateral force, $F_y$, a coefficient μ representing friction of the surface upon which the wheel is traveling, and a lateral momentum, $M_y$. These forces act, as one may appreciate, on both the front and rear axles of a vehicle. The early indication that a vehicle may spin is mathematically observable when $F_y$ becomes greater than $F_z \cdot \mu$. The subtraction of $F_z \cdot \mu$ from $F_y$ provides the remaining force. When the remaining force is greater than zero, the integration of the remaining force with regards to time describes the lateral momentum $M_y$. The concluding indication that a vehicle will spin occurs when either the front or rear axle lateral momentum is sufficiently large. On a uniform surface, when a vehicle starts to spin, the vehicle will continue to spin until enough retarding force reduces the momentum. As a result, the amount of momentum is sufficiently large if the momentum spins the vehicle until it has rotated more than 90 degrees.

Figure 2:
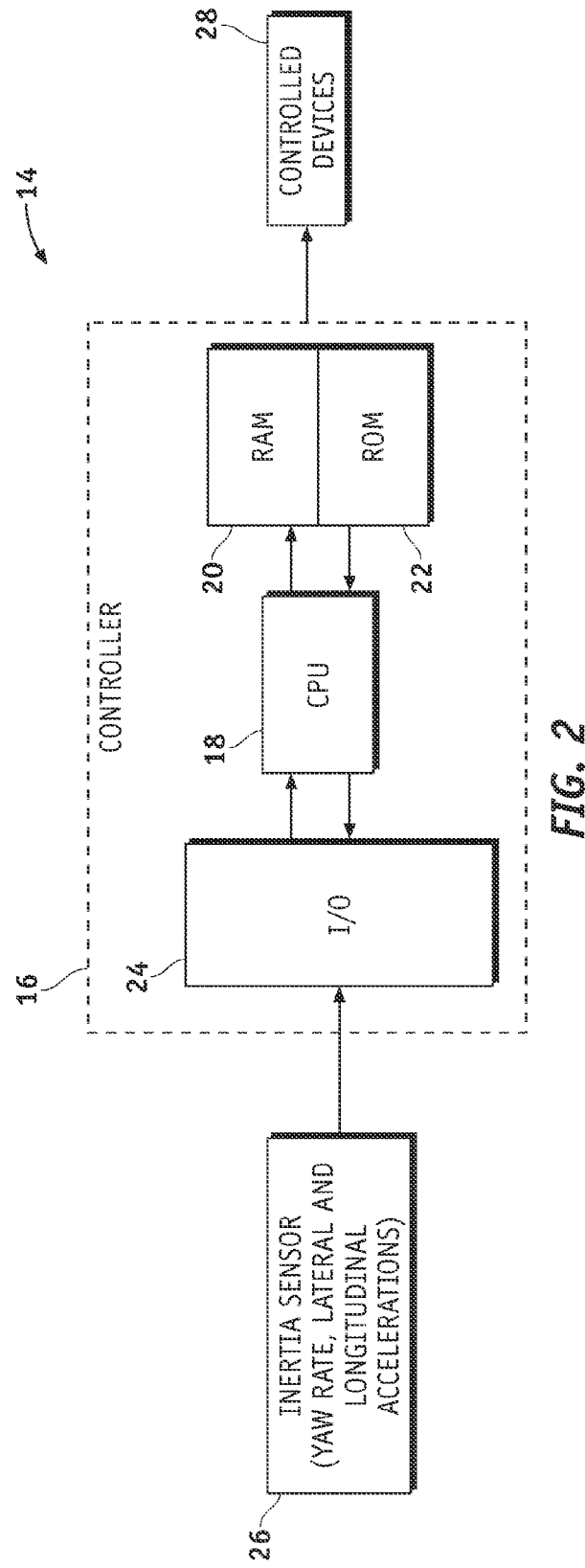
FIG. 2 is a block diagram of an exemplary embodiment of a system for detecting a vehicle in a spun condition.

FIG. 2 illustrates an exemplary system 14 for detecting a spun vehicle. A processor/controller device 16 includes a central processing unit (CPU) 18 coupled to a memory device, which can include such memory as random access memory (RAM) 20, non-volatile read only memory (NVROM) 22, and possibly other mass storage devices. CPU 18 is coupled through an input/output (I/O) interface 24 to one of a plurality of sensors which provide operational data from a vehicle at a certain moment in time, such as lateral acceleration, to the CPU 18. These sensors can include an inertia sensor cluster 26 which provides such vehicle dynamic parameters as yaw rate, lateral acceleration, and longitudinal acceleration signals to the interface 24.

As will be appreciated, system 14 can include a variety of additional components, such as additional memory or processing components for a particular application. Additionally, system 14 as depicted may be a portion of a larger overall processing component of a vehicle. System 14 may be coupled to a power source (not shown) of the vehicle, such as a 12V battery. An output of system 14 is coupled to at least one controlled device 28 such as an actuator or a motor. For example, controlled device 28 can be an additional controlled subcomponent of the aforementioned ESC system.

CPU 18 may be configured to execute computer instructions which can be stored in memories 20 and 22, or embodied in a computer program product such as a digital versatile disk (DVD) or compact disk (CD) or an equivalent. The computer instructions may include executable commands which incorporate methodologies and algorithms as further described below.

Figure 3:
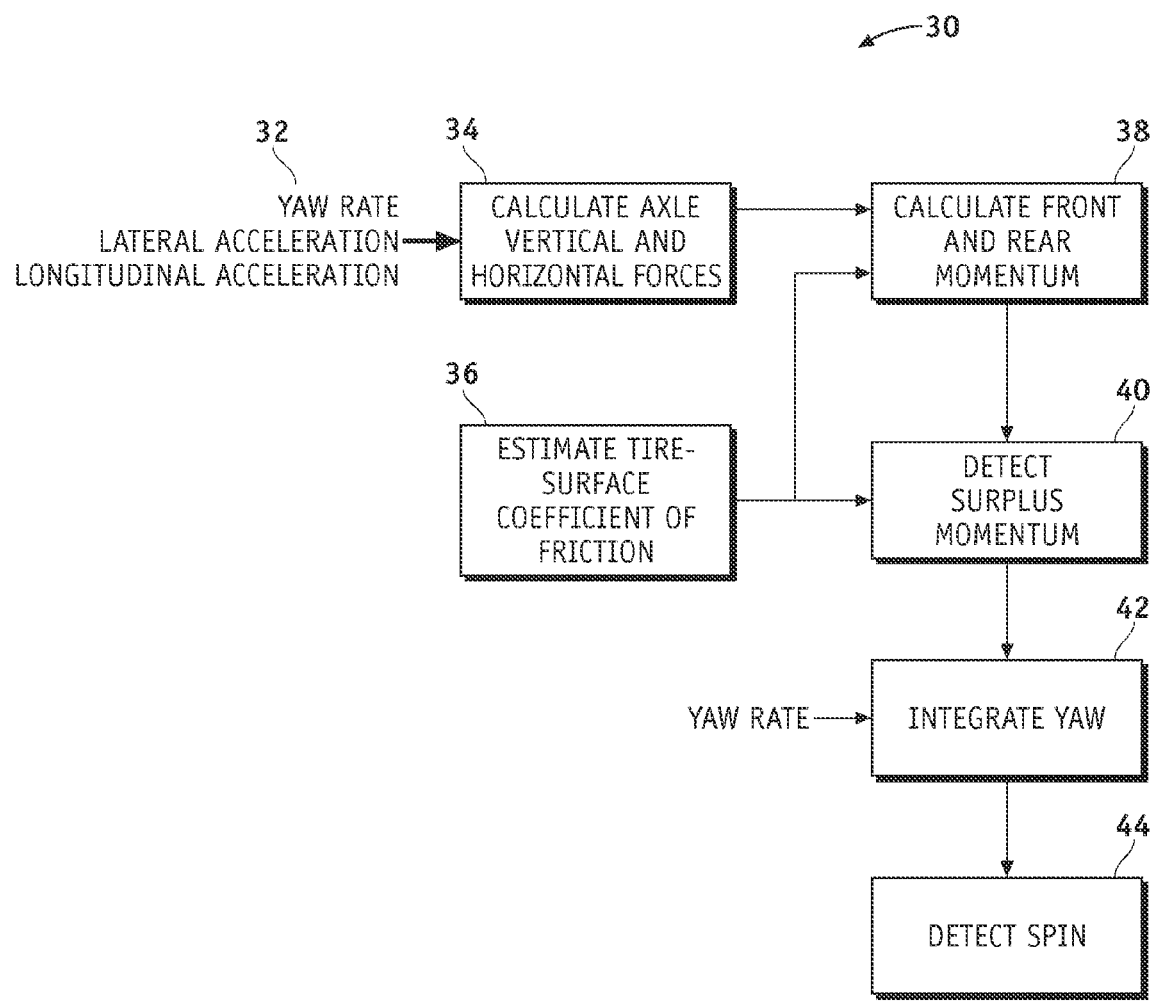
FIG. 3 is a flow diagram describing the components of an exemplary implementation for detecting a vehicle in a spun condition.

FIG. 3 illustrates a flow diagram of an exemplary vehicle spin detection method 30, which can be implemented by system 14 (FIG. 2). A series of vehicle dynamic parameters 32, which may be obtained by sensors or other means as described in the system 14, are analyzed. Parameters 32 may include yaw rate, lateral acceleration (Ay), and longitudinal acceleration (Ax).

In the aforementioned first stage of an exemplary embodiment, the estimation 34 of axle vertical and horizontal forces then proceeds. Again, various parameters 32 may be used to estimate the axle vertical and horizontal forces. The estimates may be made using the following equations (1-4)

$$F_{zf} = mg - m(Ag - Ca)/(A+B) \tag{1}$$

$$F_{zr} = m(Ag - Ca_{long})/(A+B) \tag{2}$$

$$F_{yf} = ma_{lat} - (Ama_{lat} - I\alpha)/(A+B) \tag{3}$$

$$F_{yr} = (Ama_{lat} - I\alpha)/(A+B) \tag{4}$$

where $F_{zf}$ and $F_{zr}$ are the normal forces of the front and rear axles, $F_{yf}$ and $F_{yr}$ are the lateral forces of the front and rear axles, A is a horizontal distance from the front axle to a vehicle center of gravity, B is a horizontal distance from the rear axle to the vehicle center of gravity, C is a vertical distance from ground to the vehicle center of gravity, g is gravity, m is vehicle mass, I is vehicle inertia, $a_{long}$ is a longitudinal acceleration of the vehicle center of gravity, $a_{lat}$ is a lateral acceleration of the vehicle center of gravity, and $\alpha$ is an angular acceleration of the vehicle about the vehicle center of gravity.

As one skilled in the art will appreciate constant values such as applicable distances from the front or rear axles to a particular vehicle's center of gravity, or the vehicle's mass, may vary appreciably from vehicle to vehicle. Such values can be predetermined in advance and programmed into processor 16 (FIG. 2) accordingly. Method 30 then moves to block 36, where a coefficient representing the surface (tire-surface coefficient of friction) is determined. In this second stage, a bulk estimate of the surface $\mu$ is made my using a heavily filtered value of the square root of the squares of lateral and longitudinal acceleration divided by the acceleration constant due to gravity as shown by the following equation $$\mu = SQRT[(a_{long}^2 + a_{lat}^2)/g] \tag{5}$$

where $\mu$ is the coefficient of friction representative of the surface, $a_{long}$ is a longitudinal acceleration of the vehicle center of gravity, $a_{lat}$ is a lateral acceleration of the vehicle center of gravity, and g is acceleration due to gravity.

In the third stage, represented by block 38, front and rear axle lateral momenta are calculated from the estimated forces and the tire-surface coefficient of friction. The momentum of either axle is simply the integration of any remaining forces existing on that axle, which can be represented by the following equations $$M_{yf} = \int \max(F_{yf} - F_{zf} \cdot \mu, 0) dt \tag{6}$$

$$M_{yr} = \int \max(F_{yr} - F_{zr} \cdot \mu, 0) dt \tag{7}$$

where $M_{yf}$ and $M_{yr}$ are the lateral momenta of the front and rear axles, $F_{zf}$ and $F_{zr}$ are the normal forces of the front and rear axles, $F_{yf}$ and $F_{yr}$ are the lateral forces of the front and rear axles, and $\mu$ is the coefficient of friction representative of the surface.

In the fourth stage, the momentum found at each axle is compared with a threshold based on the coefficient estimation. If either the front or the rear momentum exceeds this predetermined threshold, a surplus of momentum for the respective surface is detected. This detection of surplus momentum, if any, is represented by block 40. If surplus momentum is detected by block 40, then the yaw rate of the vehicle is integrated with respect to time in the fifth stage (represented by block 42). The resultant value is the amount that the vehicle has rotated with respect to its velocity vector.

In the sixth stage, the amount of vehicle rotation (the resultant value of the integration of the yaw rate) is compared against a predetermined threshold. This respective amount of rotation and threshold can be simplified or equated with a vehicle's degree of rotation. If the vehicle has rotated such that it is traveling sideways or backwards (in one embodiment, more than ninety degrees of vehicle orientation as compared to the velocity vector) then method 30 determines that the vehicle has spun (represented by block 44).

Figure 4:
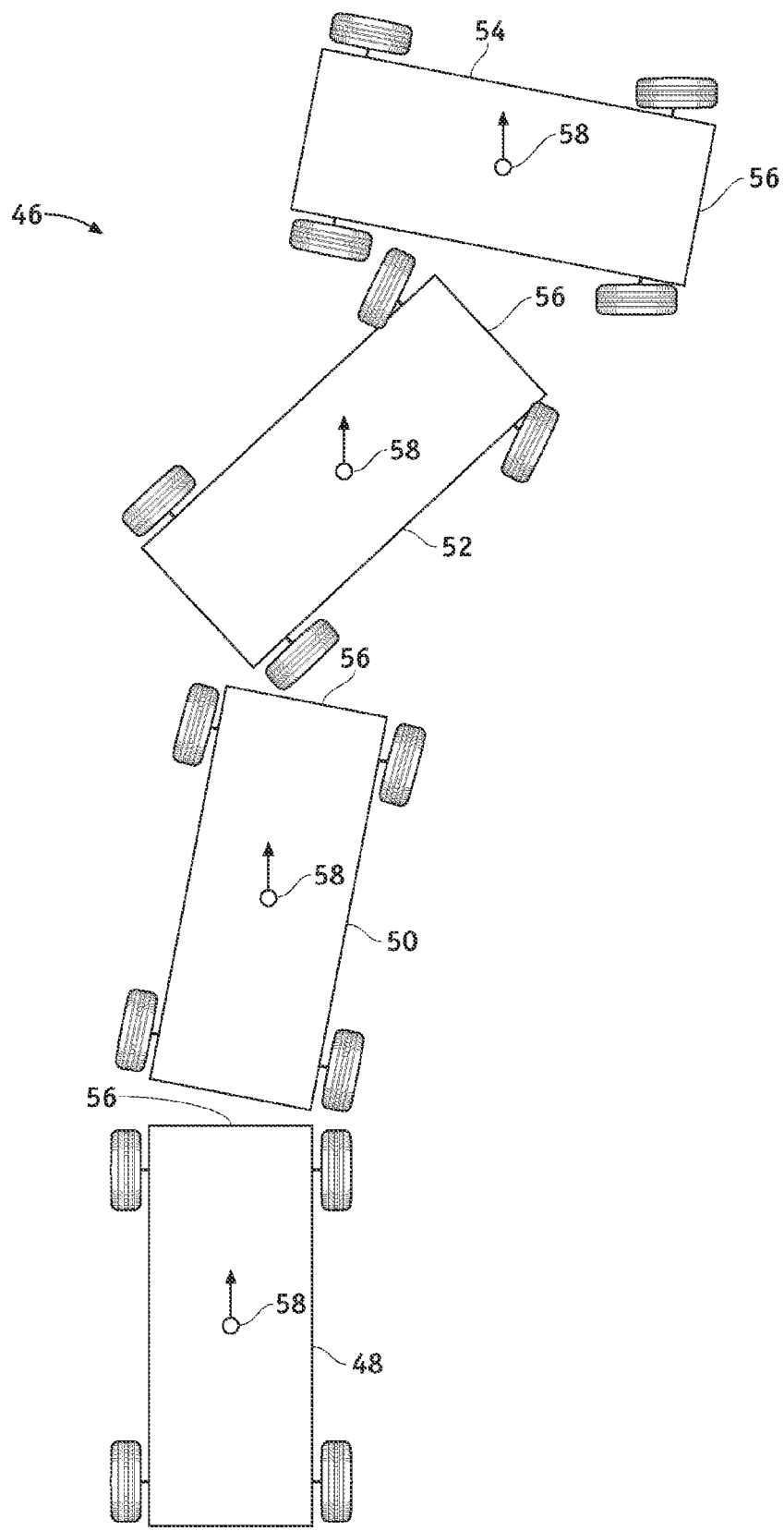
FIG. 4 is an illustration depicting a number of relationships between the front of the vehicle and the vehicle's direction of travel.

FIG. 4 conceptually illustrates a vehicle 46 in the process of spinning, depicting the changes in relative position of the front of the vehicle with the vehicle's velocity vector. The vehicle 46 is depicted in various positions 48, 50, 52, 54 as the spin takes place. The front 56 of the vehicle, as well as the velocity vector 58 of the vehicle, are identified throughout the various positions 48, 50, 52, and 54.

As the vehicle spins, the relative rotational position of the velocity vector 58 from the front of the vehicle 56 increases. By the time the vehicle 46 reaches position 54, the relative position of the vector 58 as opposed to the front 56 of the vehicle is greater than ninety (90) degrees. The methodologies described above monitor the relational position changes of the velocity vector 58 as the vehicle begins to spin. Accordingly, as previously described, when the vehicle is detected to have rotated more than a threshold (e.g., ninety degrees in the aforementioned exemplary embodiment), the vehicle is then determined to be in a spun state.

Use of the foregoing techniques provides an efficient and effective approach for determining when a vehicle has spun. The method can address conditions which previous approaches do not take into account, and provide better analysis under real dynamic conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A computer-implemented method, comprising:
   estimating a normal force and a lateral force of each of a front and rear axle of a vehicle;
   estimating a tire-surface coefficient of friction;
   calculating lateral momenta of the front and rear axles based on the coefficient of friction and the normal and lateral forces;
   determining whether a surplus momentum is present; and
   when the surplus momentum is present, integrating a yaw rate of the vehicle with respect to time to obtain a vehicle rotation estimation.

2. The method of claim 1, further including comparing the vehicle rotation estimation against a predetermined threshold to determine if the vehicle has spun.

3. The method of claim 2, wherein comparing the vehicle rotation estimation against a predetermined threshold includes setting a predetermined threshold of about 90 degrees relative to a velocity vector direction, and when the vehicle rotation estimation exceeds the predetermined threshold, detecting that the vehicle has spun.

4. The method of claim 1, wherein estimating a normal force and a lateral force of front and rear axles of a vehicle includes applying estimation equations according to $$F_{zf} = mg - m(Ag - Ca)/(A+B),$$

$$F_{zr} = m(Ag - Ca_{long})/(A+B),$$

$$F_{yf} = ma_{lat} - (Ama_{lat} - I\alpha)/(A+B), \text{ and}$$

$$F_{yr} = (Ama_{lat} - I\alpha)/(A+B),$$

where $F_{zf}$ and $F_{zr}$ are the normal forces of the front and rear axles,
$F_{yf}$ and $F_{yr}$ are the lateral forces of the front and rear axles,
A is a horizontal distance from the front axle to a vehicle center of gravity,
B is a horizontal distance from the rear axle to the vehicle center of gravity,
C is a vertical distance from ground to the vehicle center of gravity,
g is acceleration due to gravity, m is vehicle mass, I is vehicle inertia,
$a_{long}$ is a longitudinal acceleration of the vehicle center of gravity,
$a_{lat}$ is a lateral acceleration of the vehicle center of gravity, and
$\alpha$ is an angular acceleration of the vehicle about the vehicle center of gravity.

5. The method of claim 1, wherein estimating a coefficient of friction includes applying an estimation equation according to $$\mu = SQRT[(a_{long}^2 + a_{lat}^2)/g],$$

where $\mu$ is the coefficient of friction,
$a_{long}$ is a longitudinal acceleration of the vehicle center of gravity,
$a_{lat}$ is a lateral acceleration of the vehicle center of gravity, and
g is acceleration due to gravity.

6. The method of claim 1, wherein calculating lateral momenta of the front and rear axles based on the normal and lateral forces, and the coefficient includes applying estimation equations according to $$M_{yf} = \int \max(F_{yf} - F_{zf} \cdot \mu, 0) dt, \text{ and}$$

$$M_{yr} = \int \max(F_{yr} - F_{zr} \cdot \mu, 0) dt$$

where, $M_{yf}$ and $M_{yr}$ are the lateral momenta of the front and rear axles,
$F_{zf}$ and $F_{zr}$ are the normal forces of the front and rear axles,
$F_{yf}$ and $F_{yr}$ are the lateral forces of the front and rear axles, and
$\mu$ is the coefficient of friction.

7. The method of claim 1, wherein determining whether a surplus momentum is present includes comparing the lateral momenta at the front and rear axles with a threshold value based on the coefficient of friction, wherein when either the front lateral momentum or the rear lateral momentum exceed the threshold, a surplus of momentum for the surface is detected.

8. A system for determining whether a vehicle is spun, comprising:
   a processor having a plurality of sensors configured to receive a plurality of dynamic parameters of a vehicle, the processor configured to:
   estimate a normal force and a lateral force of each of a front and rear axle of a vehicle,
   estimate a tire-surface coefficient of friction,
   calculate lateral momenta of the front and rear axles based on the coefficient of friction and the normal and lateral forces,
   determine whether a surplus momentum is present, and
   when the surplus momentum is present, integrate a yaw rate of the vehicle with respect to time to obtain a vehicle rotation estimation.

9. The system of claim 8, wherein the processor is further configured to compare the vehicle rotation estimation against a predetermined threshold to determine if the vehicle has spun.

10. The system of claim 9, wherein the processor is further configured to set a predetermined threshold of about 90 degrees relative to a velocity vector direction, and when the vehicle rotation estimation exceeds the predetermined threshold, detect that the vehicle has spun.

11. The system of claim 8, wherein the processor is configured to apply normal force and lateral force estimation equations according to $$F_{zf}=mg-m(Ag-Ca)/(A+B),$$

$$F_{zr}=m(Ag-Ca_{long})/(A+B),$$

$$F_{yf}=ma_{lat}-(Ama_{lat}-I\alpha)/(A+B), \text{ and}$$

$$F_{yr}=(Ama_{lat}-I\alpha)/(A+B),$$

where $F_{zf}$ and $F_{zr}$ are the normal forces of the front and rear axles,
$F_{yf}$ and $F_{yr}$ are the lateral forces of the front and rear axles,
A is a horizontal distance from the front axle to a vehicle center of gravity,
B is a horizontal distance from the rear axle to the vehicle center of gravity,
C is a vertical distance from ground to the vehicle center of gravity,
g is acceleration due to gravity, m is vehicle mass, I is vehicle inertia,
$a_{long}$ is a longitudinal acceleration of the vehicle center of gravity,
$a_{lat}$ is a lateral acceleration of the vehicle center of gravity, and
$\alpha$ is an angular acceleration of the vehicle about the vehicle center of gravity.

12. The system of claim 8, wherein the processor is configured to apply a surface estimation equation according to $$\mu=SQRT[(a_{long}^2+a_{lat}^2)/g],$$

where $\mu$ is the coefficient of friction,
$a_{long}$ is a longitudinal acceleration of the vehicle center of gravity,
$a_{lat}$ is a lateral acceleration of the vehicle center of gravity, and
g is acceleration due to gravity.

13. The system of claim 8, wherein the processor is configured to apply lateral momenta estimation equations according to $$M_{yf}=\int \max(F_{yf}-F_{zr}\cdot\mu,0)dt, \text{ and}$$

$$M_{yr}=\int \max(F_{yr}-F_{zr}\cdot\mu,0)dt$$

where $M_{yf}$ and $M_{yr}$ are the lateral momenta of the front and rear axles,
$F_{zf}$ and $F_{zr}$ are the normal forces of the front and rear axles,
$F_{yf}$ and $F_{yr}$ are the lateral forces of the front and rear axles, and
$\mu$ is the coefficient of friction.

14. The system of claim 8, wherein the processor is configured to compare the lateral momenta at the front and rear axles with a threshold value based on the coefficient of friction, wherein when either the front lateral momentum or the rear lateral momentum exceed the threshold, a surplus of momentum for the surface is detected.

15. A computer program product for determining if a vehicle is spun, the computer program product comprising a computer-readable storage medium having computer-readable program code portions stored therein, the computer-readable program code portions comprising:
a first executable portion for estimating a normal force and a lateral force of each of a front and rear axle of a vehicle;
a second executable portion for estimating a tire-surface coefficient of friction;
a third executable portion for calculating lateral momenta of the front and rear axles based on the coefficient of friction and the normal and lateral forces;
a fourth executable portion for determining whether a surplus momentum is present; and
a fifth executable portion for, when the surplus momentum is present, integrating a yaw rate of the vehicle with respect to time to obtain a vehicle rotation estimation.

16. The computer program product of claim 15, further including a sixth executable portion for comparing the vehicle rotation estimation against a predetermined threshold to determine if the vehicle has spun.

17. The computer program product of claim 16, wherein the sixth executable portion for comparing the vehicle rotation estimation against a predetermined threshold includes computer-readable program code for setting a predetermined threshold of about 90 degrees relative to a velocity vector direction, and when the vehicle rotation estimation exceeds the predetermined threshold, detecting that the vehicle has spun.

18. The system of claim 15, wherein the first executable portion for estimating a normal force and a lateral force of front and rear axles of a vehicle includes computer-readable program code for applying estimation equations according to $$F_{zf}=mg-m(Ag-Ca)/(A+B),$$

$$F_{zr}=m(Ag-Ca_{long})/(A+B),$$

$$F_{yf}=ma_{lat}-(Ama_{lat}-I\alpha)/(A+B), \text{ and}$$

$$F_{yr}=(Ama_{lat}-I\alpha)/(A+B),$$

where $F_{zf}$ and $F_{zr}$ are the normal forces of the front and rear axles,
$F_{yf}$ and $F_{yr}$ are the lateral forces of the front and rear axles,
A is a horizontal distance from the front axle to a vehicle center of gravity,
B is a horizontal distance from the rear axle to the vehicle center of gravity,
C is a vertical distance from ground to the vehicle center of gravity,
g is acceleration due to gravity, m is vehicle mass, I is vehicle inertia,
$a_{long}$ is a longitudinal acceleration of the vehicle center of gravity,
$a_{lat}$ is a lateral acceleration of the vehicle center of gravity, and
$\alpha$ is an angular acceleration of the vehicle about the vehicle center of gravity.

19. The system of claim 15, wherein the second executable portion for estimating a coefficient of friction includes computer-readable program code for applying an estimation equation according to $$\mu=SQRT[(a_{long}^2+a_{lat}^2)/g],$$

where $\mu$ is the coefficient of friction,
$a_{long}$ is a longitudinal acceleration of the vehicle center of gravity,
$a_{lat}$ is a lateral acceleration of the vehicle center of gravity, and
g is acceleration due to gravity.

20. The system of claim 15, wherein the third executable portion for calculating lateral momenta of the front and rear axles based on the normal and lateral forces, and the coefficient includes computer-readable program code for applying estimation equations according to $$M_{yf} = \int \max(F_{yf} - F_{zf} \cdot \mu, 0) dt, \text{ and}$$

$$M_{yr} = \int \max(F_{yr} - F_{zr} \cdot \mu, 0) dt$$

where $M_{yf}$ and $M_{yr}$ are the lateral momenta of the front and rear axles, $F_{zf}$ and $F_{zr}$ are the normal forces of the front and rear axles, $F_{yf}$ and $F_{yr}$ are the lateral forces of the front and rear axles, and $\mu$ is the coefficient of friction.

21. The system of claim 15, wherein the fourth executable portion for determining whether a surplus momentum is present includes computer-readable program code for comparing the lateral momenta at the front and rear axles with a threshold value based on the coefficient of friction, wherein when either the front lateral momentum or the rear lateral momentum exceed the threshold, a surplus of momentum for the surface is detected.

* * * * *